United States Patent
Maple et al.

(10) Patent No.: US 10,452,508 B2
(45) Date of Patent: Oct. 22, 2019

(54) MANAGING A SET OF TESTS BASED ON OTHER TEST FAILURES

(71) Applicant: International Business Machines Corporation, Armonk (GB)

(72) Inventors: Elizabeth J. Maple, Winchester (GB); Alexander R. Pringle, Hull (GB); Kevin B. Smith, Chandlers Ford (GB); David R. Waddling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 14/739,009

(22) Filed: Jun. 15, 2015

(65) Prior Publication Data

US 2016/0364310 A1 Dec. 15, 2016

(51) Int. Cl.
*G06F 11/30* (2006.01)
*G06F 11/34* (2006.01)

(52) U.S. Cl.
CPC ........ *G06F 11/302* (2013.01); *G06F 11/3409* (2013.01)

(58) Field of Classification Search
CPC .................. G06F 11/3684; G01R 31/2884
USPC .................................................. 702/123, 122
See application file for complete search history.

(56) References Cited

U.S. PATENT DOCUMENTS

| | | | |
|---|---|---|---|
| 5,715,373 A * | 2/1998 | Desgrousilliers | G06F 11/263 706/11 |
| 6,078,189 A | 6/2000 | Noel | |
| 6,769,115 B1 * | 7/2004 | Oldman | G06F 8/36 717/121 |
| 6,907,378 B2 | 6/2005 | Stirrat et al. | |
| 7,207,041 B2 * | 4/2007 | Elson | G06F 9/5011 718/1 |
| 7,594,234 B1 * | 9/2009 | Dice | G06F 9/461 718/100 |
| 7,809,988 B1 | 10/2010 | Portal et al. | |
| 7,937,622 B2 * | 5/2011 | Mehrotra | G06F 11/3684 714/25 |
| 8,875,102 B1 * | 10/2014 | Feng | G06F 9/45529 717/124 |
| 9,021,443 B1 * | 4/2015 | Lachwani | G06F 11/3688 717/124 |
| 9,164,874 B1 * | 10/2015 | Tomay | G06F 11/366 |

(Continued)

OTHER PUBLICATIONS

Gotkhindikar, et al.; "Die-level Adaptive Test: Real-time Test Reordering and Elimination"; International Test Conference; Paper 15.1; 978-1-4577-0152-8/11; pp. 1-10; ©2011 IEEE.

(Continued)

*Primary Examiner* — Michael T Tran
(74) *Attorney, Agent, or Firm* — Edward J. Wixted, III (57) ABSTRACT

In an approach for managing a set of tests to run on a set of platforms, a processor identifies a set of tests to run on a set of platforms and one or more priorities associated with the set of tests. A processor sends the set of tests and the one or more priorities associated with the set of tests to the set of platforms. A processor receives information about a first test run of a first test on a first platform of the set of platforms. A processor determines that the first test failed on the first platform. A processor updates the one or more priorities associated with the set of tests. A processor sends the updated one or more priorities associated with the set of tests to at least the second platform.

16 Claims, 5 Drawing Sheets

(56) References Cited

U.S. PATENT DOCUMENTS

| | | | |
|---|---|---|---|
| 9,225,776 B1* | 12/2015 | Kochura | H04L 67/1002 |
| 9,286,193 B2* | 3/2016 | Brown | G06F 11/3684 |
| 9,529,700 B2* | 12/2016 | Raghavan | G06F 11/3688 |
| 9,575,873 B2* | 2/2017 | Jakobs | G06F 11/3672 |
| 2002/0053045 A1 | 5/2002 | Gillenwater et al. | |
| 2002/0075734 A1* | 6/2002 | Munro | G11C 7/1006 |
| | | | 365/200 |
| 2002/0147966 A1* | 10/2002 | Frazier | G06F 11/3409 |
| | | | 717/127 |
| 2002/0166081 A1* | 11/2002 | Richardson | G06F 16/10 |
| | | | 714/33 |
| 2004/0030809 A1* | 2/2004 | Lozano | G06F 9/4411 |
| | | | 710/8 |
| 2005/0038581 A1* | 2/2005 | Kapolka | G06Q 10/08 |
| | | | 701/31.4 |
| 2005/0107066 A1* | 5/2005 | Erskine | H04L 12/1457 |
| | | | 455/405 |
| 2006/0048005 A1* | 3/2006 | Gollub | G06F 11/0712 |
| | | | 714/25 |
| 2006/0265172 A1* | 11/2006 | Basham | G06F 11/26 |
| | | | 702/117 |
| 2007/0168970 A1* | 7/2007 | Li | G06F 9/5038 |
| | | | 717/124 |
| 2007/0234217 A1* | 10/2007 | Miller | H04L 43/50 |
| | | | 715/738 |
| 2008/0162992 A1 | 7/2008 | Lonowski | |
| 2008/0184206 A1* | 7/2008 | Vikutan | G06F 11/3688 |
| | | | 717/127 |
| 2009/0134947 A1* | 5/2009 | Tarng | H03B 5/04 |
| | | | 331/116 FE |
| 2009/0265681 A1* | 10/2009 | Beto | G06F 11/3688 |
| | | | 717/100 |
| 2009/0276663 A1* | 11/2009 | Kaksonen | G06F 11/263 |
| | | | 714/25 |
| 2009/0279673 A1* | 11/2009 | Maffre | H04L 43/50 |
| | | | 379/1.03 |
| 2009/0292956 A1* | 11/2009 | Rivera | G06F 11/368 |
| | | | 714/48 |
| 2009/0309556 A1* | 12/2009 | Franco | G01R 31/31721 |
| | | | 323/234 |
| 2010/0063674 A1* | 3/2010 | Karolak | G01M 15/05 |
| | | | 701/33.4 |
| 2010/0146488 A1* | 6/2010 | Chen | G06F 16/9577 |
| | | | 717/128 |
| 2010/0198808 A1* | 8/2010 | Graefe | G06F 17/30474 |
| | | | 707/713 |
| 2010/0268502 A1* | 10/2010 | Jayasudha | G06F 11/3672 |
| | | | 702/82 |
| 2010/0287534 A1* | 11/2010 | Vangala | G06F 11/3612 |
| | | | 717/124 |
| 2011/0202974 A1* | 8/2011 | Leader | G16H 10/60 |
| | | | 726/4 |
| 2011/0239064 A1* | 9/2011 | Byom | G06F 11/1048 |
| | | | 714/723 |
| 2011/0246540 A1* | 10/2011 | Salman | G06F 11/3672 |
| | | | 707/812 |
| 2011/0288808 A1 | 11/2011 | Fan et al. | |
| 2011/0289440 A1* | 11/2011 | Carter | G06F 11/3688 |
| | | | 715/771 |
| 2011/0296382 A1* | 12/2011 | Pasternak | G06F 11/3688 |
| | | | 717/124 |
| 2012/0079155 A1* | 3/2012 | Damodaran | H03K 19/0016 |
| | | | 710/244 |
| 2012/0102461 A1* | 4/2012 | Schwartz | G06F 9/45512 |
| | | | 717/124 |
| 2012/0204153 A1* | 8/2012 | Peterson | G06F 11/3672 |
| | | | 717/124 |
| 2012/0246514 A1 | 9/2012 | Chen et al. | |
| 2012/0303850 A1* | 11/2012 | Sarkar | G06F 13/26 |
| | | | 710/265 |
| 2013/0111267 A1* | 5/2013 | Beryoza | G06F 11/3688 |
| | | | 714/32 |
| 2013/0111269 A1* | 5/2013 | Wu | G06F 11/366 |
| | | | 714/32 |
| 2013/0246439 A1* | 9/2013 | Liekens | G06F 17/30958 |
| | | | 707/748 |
| 2013/0247061 A1* | 9/2013 | Kiehn | G06F 9/5044 |
| | | | 718/104 |
| 2013/0282892 A1* | 10/2013 | Levi | H04L 43/50 |
| | | | 709/224 |
| 2013/0290786 A1* | 10/2013 | Artzi | G06F 11/3676 |
| | | | 714/32 |
| 2013/0331082 A1* | 12/2013 | Topaltzas | H04W 24/06 |
| | | | 455/419 |
| 2014/0081700 A1* | 3/2014 | Mehta | G06Q 10/06 |
| | | | 705/7.28 |
| 2014/0089873 A1* | 3/2014 | Bures | G06F 17/5022 |
| | | | 716/107 |
| 2014/0245070 A1* | 8/2014 | Rumble | G06F 11/3692 |
| | | | 714/38.14 |
| 2014/0351793 A1* | 11/2014 | Bartley | G06F 11/3676 |
| | | | 717/124 |
| 2014/0380277 A1* | 12/2014 | Bhagavatula | G06F 11/3684 |
| | | | 717/124 |
| 2015/0019982 A1* | 1/2015 | Petitt, Jr. | H04W 4/029 |
| | | | 715/738 |
| 2015/0026121 A1* | 1/2015 | Shani | G06F 11/3688 |
| | | | 707/609 |
| 2015/0204894 A1* | 7/2015 | Killeen | G01N 35/00871 |
| | | | 702/31 |
| 2015/0331779 A1* | 11/2015 | Subramaniam | G06F 11/368 |
| | | | 717/124 |
| 2016/0004628 A1* | 1/2016 | Gugri | G06F 11/3688 |
| | | | 717/124 |
| 2016/0026562 A1* | 1/2016 | Hwang | G06F 11/3688 |
| | | | 714/38.1 |
| 2016/0162392 A1* | 6/2016 | Hu | G06F 11/3684 |
| | | | 714/38.1 |
| 2016/0180432 A1* | 6/2016 | Thakur | G06Q 30/0625 |
| | | | 705/26.62 |
| 2017/0024308 A1* | 1/2017 | Knoulich | G06F 8/60 |
| 2017/0148000 A1* | 5/2017 | Hopen | G06Q 20/105 |
| 2017/0262130 A1* | 9/2017 | Lloyd | G06F 11/3688 |
| 2017/0279681 A1* | 9/2017 | Vuolteenaho | H04L 41/0866 |
| 2017/0371937 A1* | 12/2017 | Shah | G06F 8/71 |
| 2018/0067845 A1* | 3/2018 | Costello, Jr. | G06F 11/3688 |
| 2018/0210822 A1* | 7/2018 | Saginaw | G06F 11/3688 |

OTHER PUBLICATIONS

Niederwieser, Peter; "Spock 0.5 Released"; Google Groups; Spock Framework—User; Dec. 10, 2010; pp. 1-14; <https://groups.google.com/forum/#!topic/spockframework/b4SIHpnYNTE/discussion>.

* cited by examiner

MANAGING A SET OF TESTS BASED ON OTHER TEST FAILURES

BACKGROUND OF THE INVENTION

The present invention relates generally to the field of software testing, and more particularly to managing a set of tests based on other test failures in an asynchronous environment.

Software testing is an investigation conducted to provide stakeholders with information about the quality of the product or service under test. Software testing can also provide an objective, independent view of the software to allow the business to appreciate and understand the risks of software implementation. Test techniques include, but are not limited to, the process of executing a program or application with the intent of finding software bugs (errors or other defects).

SUMMARY

Aspects of an embodiment of the present invention disclose a method, computer program product, and computing system for managing a set of tests to run on a set of platforms. A processor identifies a set of tests to run on a set of platforms and one or more priorities associated with the set of tests. A processor sends the set of tests and the one or more priorities associated with the set of tests to the set of platforms. A processor receives information about a first test run of a first test on a first platform of the set of platforms. A processor determines that the first test failed on the first platform. A processor updates the one or more priorities associated with the set of tests. A processor sends the updated one or more priorities associated with the set of tests to at least the second platform.

DETAILED DESCRIPTION

With the current state of software testing, the testing often involves asynchronously running a set of tests against a pool of hardware. The tests are divided amongst the hardware and this parallelism allows for the test run to be completed in a shorter amount of time. Tests can be prioritized based on various factors, such as individual running time, perceived impact, coverage, etc. With the current state of software testing, the prioritization occurs before starting the test run.

Currently, there are cases where a piece of software is designed to run on multiple platforms, and the asynchronous nature of the testing can be used to run the tests across the platforms in parallel. In all present cases, the prioritization of tests occurs before the test run begins and remains unaltered throughout the run. Embodiments of the present invention, recognize that an approach to dynamically reprioritize queued tests based on test failures, as the failures occur within the run, can provide several improvements. Embodiments of the present invention detail an approach that can be used to dynamically reorder pending tests on a plurality of platforms based on the outcome of running tests on another platform.

There are benefits that may occur when a test fails on one platform and the same test that is queued for other platforms can be raised in priority and run sooner. One benefit is that more diagnostic information about the failure can be collected if/when the failure reoccurs on other platforms. Collecting this information as quickly as possible provides debug information and enables the program and/or developers to rapidly begin to diagnose the reasons for failure. Another benefit is that additional conclusions can be drawn between the test failure and which platforms the test failure affects, which can further aid diagnosis. For example, does the test only fail on a certain operating system platform or does it fail on all operating system platforms? Additionally, for example, does the test fail on a certain device or does it fail on all devices? Finally, the reprioritized tests can have additional debugging/trace options enabled before they are run to further increase the amount of diagnostic information provided when they run. If enabling additional options is done manually, the additional options may not be enabled before the tests run and would require another test run to gather more diagnostic information.

Embodiments of the present invention will now be described in detail with reference to the Figures.

Figure 1:
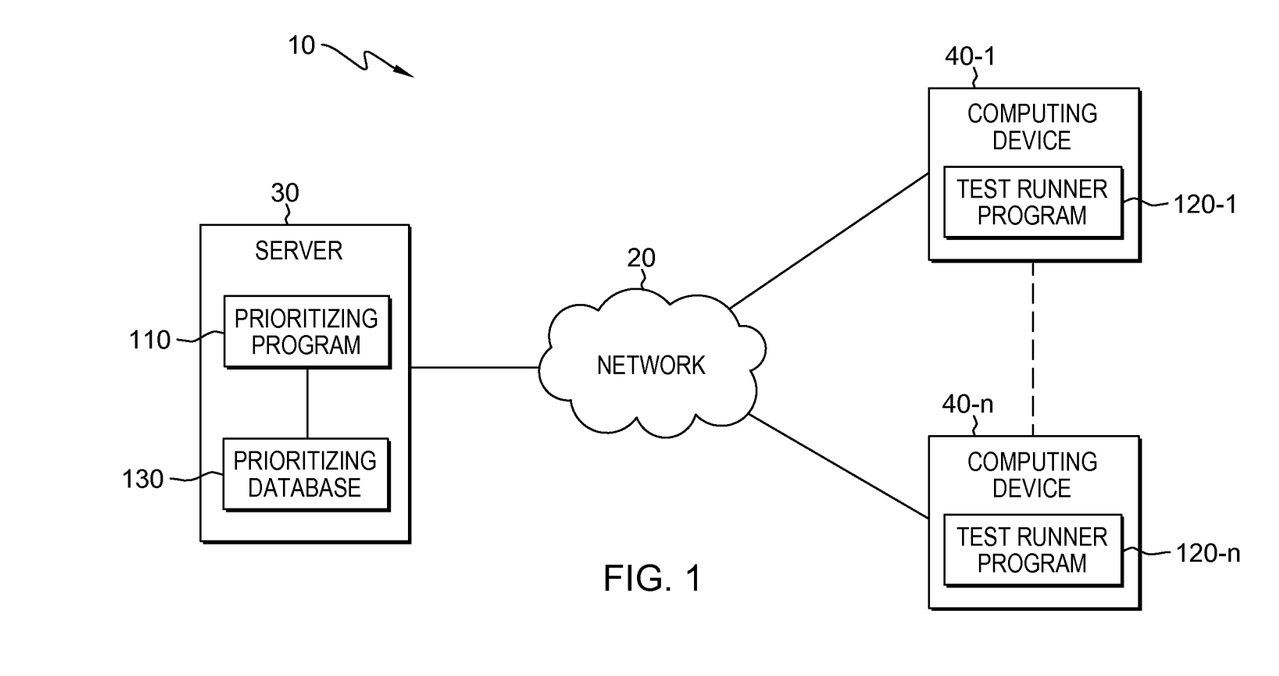
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing device 40 is labeled as "1-n," which signifies there may be one computing device 40 or any number (e.g., n-number) of computing device 40 in various embodiments of the present invention. Hereafter, computing device 40, when mentioned without "1-n," will signify any one specific computing device within the collective computing device 40 "1-n."

Additionally, in the depicted embodiment, test runner program 120 is labeled as "1-n," which signifies there may be one test runner program 120 or any number (e.g., n-number) of test runner program 120 in various embodiments of the present invention. Hereafter, test runner program 120, when mentioned without "1-n," will signify any one specific test runner program within the collective test runner program 120 "1-n."

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains prioritizing program 110 and prioritizing database 130. In other embodiments, server 30 may include other components, as depicted and described in further detail with respect to FIG. 5.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains test runner program 120. In other embodiments, computing device 40 may include other components, as depicted and described in further detail with respect to FIG. 5.

Prioritizing program 110 manages a set of tests to run on a set of platforms, such as, operating system platforms. In doing so, prioritizing program 110 identifies a set of tests and associated priorities to run on a set of platforms. Prioritizing program 110 sends workloads of tests and priorities to test runner program 120-1 through 120-n (see FIG. 3). Prioritizing program 110 receives information about the test run from test runner program 120-1 through 120-n (see FIG. 3). In response to a failed test on the first platform, prioritizing program 110 increases the priority of the test to run on a second platform. In the depicted embodiment, prioritizing program 110 resides on server 30. In other embodiments, prioritizing program 110 may reside on another server, computing device, or computing device 40, provided that prioritizing program 110 can access test runner program 120 and prioritizing database 130 via network 20.

Test runner program 120 runs a set of tests on a set of platforms, such as, operating system platforms. In doing so, test runner program 120 receives workloads of tests and priorities from prioritizing program 110 (see FIG. 2). Test runner program 120 runs a test on a first platform. Test runner program 120 sends information about the test run to prioritizing program 110 (see FIG. 2). In the depicted embodiment, test runner program 120 resides on computing device 40. In other embodiments, test runner program 120 may reside on another computing device, server, or server 30, provided that test runner program 120 can access prioritizing program 110 and prioritizing database 130 via network 20.

Prioritizing database 130 may be a repository that may be written to and/or read by prioritizing program 110 and/or test runner program 120. In some embodiments, a program (not shown) may allow an administrator or other user to define various tests to run and store to prioritizing database 130. In other embodiments, prioritizing database 130 may store tests and/or information about tests that were previously ran. In the depicted embodiment, prioritizing database 130 resides on server 30. In other embodiments, prioritizing database 130 may reside on another server, computing device, or computing device 40, provided that prioritizing database 130 is accessible to prioritizing program 110 and test runner program 120 via network 20.

Figure 2:
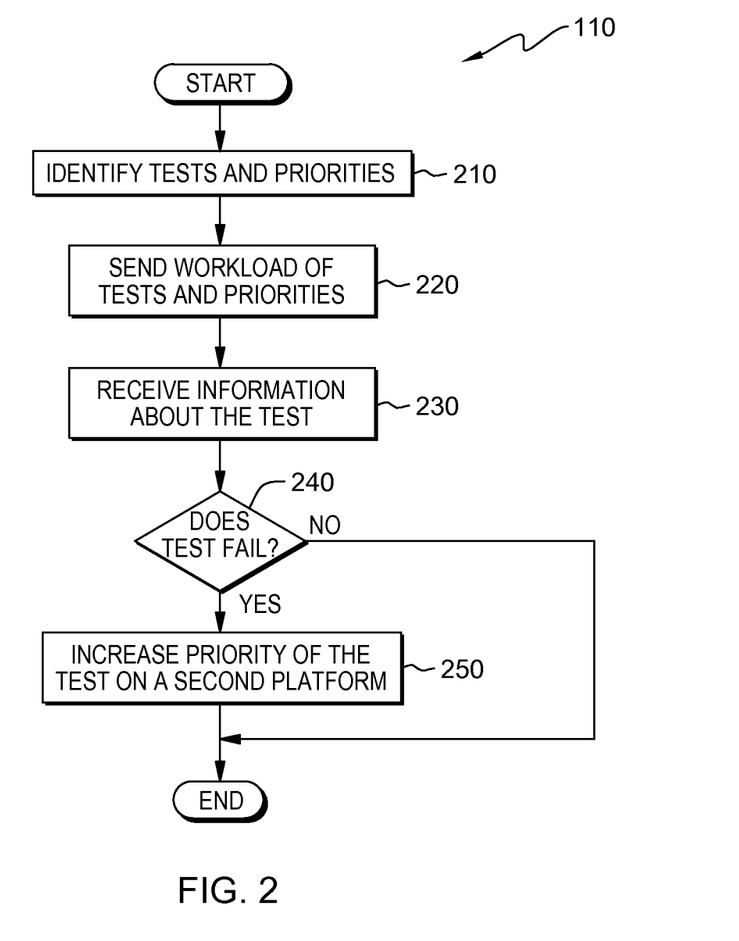
FIG. 2 depicts a flowchart of the steps of a prioritizing program, executing within the computing system of FIG. 1, for managing a set of tests to run on a set of platforms, in accordance with an embodiment of the present invention.

FIG. 2 depicts a flowchart of the steps of a prioritizing program, executing within the computing system of FIG. 1, in accordance with an embodiment of the present invention. Prioritizing program 110 manages a set of tests to run on a set of operating system platforms.

In step 210, prioritizing program 110 identifies a set of tests and associated priorities to run on a set of platforms. In some embodiments, prioritizing program 110 receives the set of tests and associated priorities from an administrator. In other embodiments, prioritizing program 110 retrieves the set of tests and associated priorities from prioritizing database 130.

Figure 3:
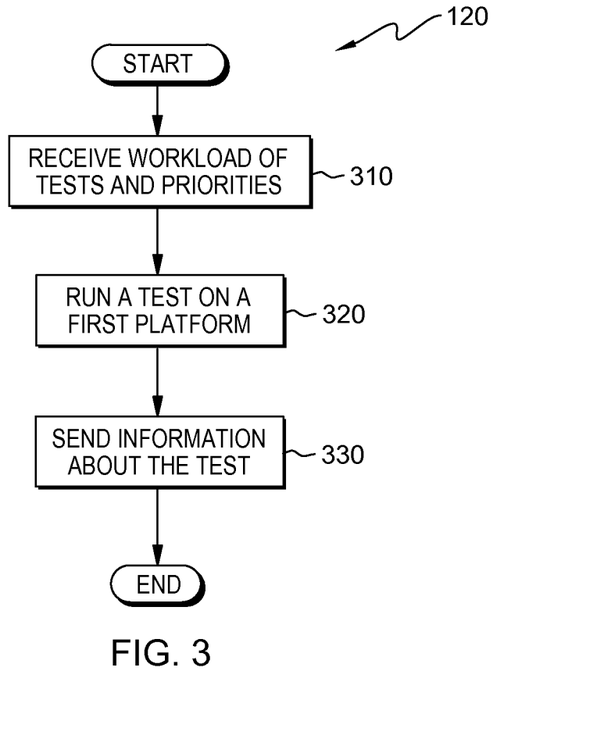
FIG. 3 depicts a flowchart of the steps of a test runner program, executing with the computing system of FIG. 1, for running a set of tests on a set of platforms, in accordance with an embodiment of the present invention.

In step 220, prioritizing program 110 sends workloads of tests and associated priorities to test runner program 120 (see FIG. 3). In doing so, prioritizing program 110 sends applicable workloads to applicable test runner programs 120-1 through 120-n. The tests will be used for various reasons, such as, for example, testing multiple mobile phone handsets and operating systems. Using these tests, prioritizing program 110 will be able to identify if the test fails on one device, operating system, or a combination of both, but does not fail on other types of environments. Testing is not aborted after the first failure, as the aim is to identify all test failures in each environment.

In step 230, prioritizing program 110 receives information about the test run from test runner program 120 (see FIG. 3). The information about the test run may be any information that would allow prioritizing program 110 to better understand the test and/or the platform on which the test runs, such as whether a test passed or failed. In some embodiments, prioritizing program 110 receives the information while the test is running on test runner program 120. In other embodiments, prioritizing program 110 receives the information at the conclusion of the test run on test runner program 120. In one embodiment, prioritizing program 110 receives the information in the form of a report generated by test runner program 120. In other embodiments, prioritizing program 110 retrieves the information and/or reports generated by test runner program 120 from prioritizing database 130.

In decision 240, prioritizing program 110 determines whether the test run on the first platform fails. Prioritizing program 110 makes this determination using the information received from test runner program 120. If prioritizing program 110 determines that the test run on the first platform does not fail (decision 240, no branch), prioritizing program 110 ends. If prioritizing program 110 determines that the test run on the first platform fails (decision 240, yes branch), prioritizing program 110 increases the priority of the test to run on a second platform (step 250).

In step 250, in one embodiment, prioritizing program 110 sends an altered workload to the instance of test runner program 120 on the second platform, which causes this instance of test runner program 120 to make the failed test the next test in queue to run on the second platform. In some embodiments, prioritizing program 110 is connected to other services, such as infrastructure monitoring services. Infrastructure monitoring service is a process within a distributed system for collecting and storing data. Here, prioritizing program 110 may do the opposite and delay a test by lowering the test's priority if the required test became unavailable within the infrastructure, and thus attempt to avoid the test failing due to an infrastructure problem rather than a defect.

There are benefits that may occur when a test fails on one platform and the same test that is queued for other platforms can be raised in priority and run sooner. One benefit is that more diagnostic information about the failure can be collected if/when the failure reoccurs on other platforms. Collecting this information as quickly as possible provides debug information and enables the program and/or developers to rapidly begin to diagnose the reasons for failure. Another benefit is that additional conclusions can be drawn between the test failure and which platforms the test failure affects, which can further aid diagnosis. For example, does the test only fail on a certain operating system platform or does it fail on all operating system platforms? Additionally, for example, does the test fail on a certain device or does it fail on all devices? Finally, the reprioritized tests can have additional debugging/trace options enabled before they are run to further increase the amount of diagnostic information provided when they run. If enabling additional options is done manually, the additional options may not be enabled before the tests run and would require another test run to gather more diagnostic information.

After prioritizing program 110 increases the prioritization for the test on the second platform, the second platform will run the test according to the prioritization instruction of prioritizing program 110. Sometimes the second platform runs the test sooner than originally scheduled. At other times, the second platform runs the test next. Still, at other times, the second platform runs the test following a specified period of time (e.g., 10 seconds after the first test fails or 5 seconds after the current test on the second platform completes its run). There may be a plurality of platforms that do this process after prioritizing program 110 increases the prioritization for the test on each respective platform.

Prioritizing program 110 and test runner program 120 can be used to test multiple mobile phone handsets and operating systems. For example, a developer may be testing a mobile application on a number of different handset models that have different versions of operating systems installed. By using prioritizing program 110 and test runner program 120, the various handset/operating system combinations could be tested simultaneously, and thus allowing for the dynamic prioritization of tests based on failures. Therefore, a test that fails on one handset/operating system combination will be prioritized on the other handset/operating system combinations to determine whether the problem is related to the handset, operating system, or the combination of the handset and operating system.

FIG. 3 depicts a flowchart of the steps of a test runner program, executing within the computing system of FIG. 1, in accordance with an embodiment of the present invention. Test runner program 120 runs a set of tests on a set of operating system platforms.

In step 310, test runner program 120 receives workloads of tests and associated priorities from prioritizing program 110 (see FIG. 2). The tests will be used for various reasons, such as testing multiple mobile phone handsets and operating systems.

In step 320, an instance of test runner program 120 runs a test on a first platform. In one embodiment, while the test is running, test runner program 120 generates information concerning the test. In other embodiments, test runner program 120 generates information concerning the outcome of the test. In some embodiments, while the test is running, test runner program 120 generates a report detailing the information concerning the test. Still, in other embodiments, test runner program 120 generates a report detailing the outcome of the test.

In step 330, test runner program 120 sends information about the test run to prioritizing program 110 (see FIG. 2). The information about the test run may be any information that would allow prioritizing program 110 to better understand the test and/or the platform on which the test runs, such as whether a test passed or failed. In some embodiments, test runner program 120 sends the information while the test is running. In other embodiments, test runner program 120 sends the information at the conclusion of the test run. In one embodiment, test runner program 120 sends the information in the form of a report generated. In other embodiments, test runner program 120 stores the information and/or reports detailing the information concerning the test to prioritizing database 130.

Figure 4:
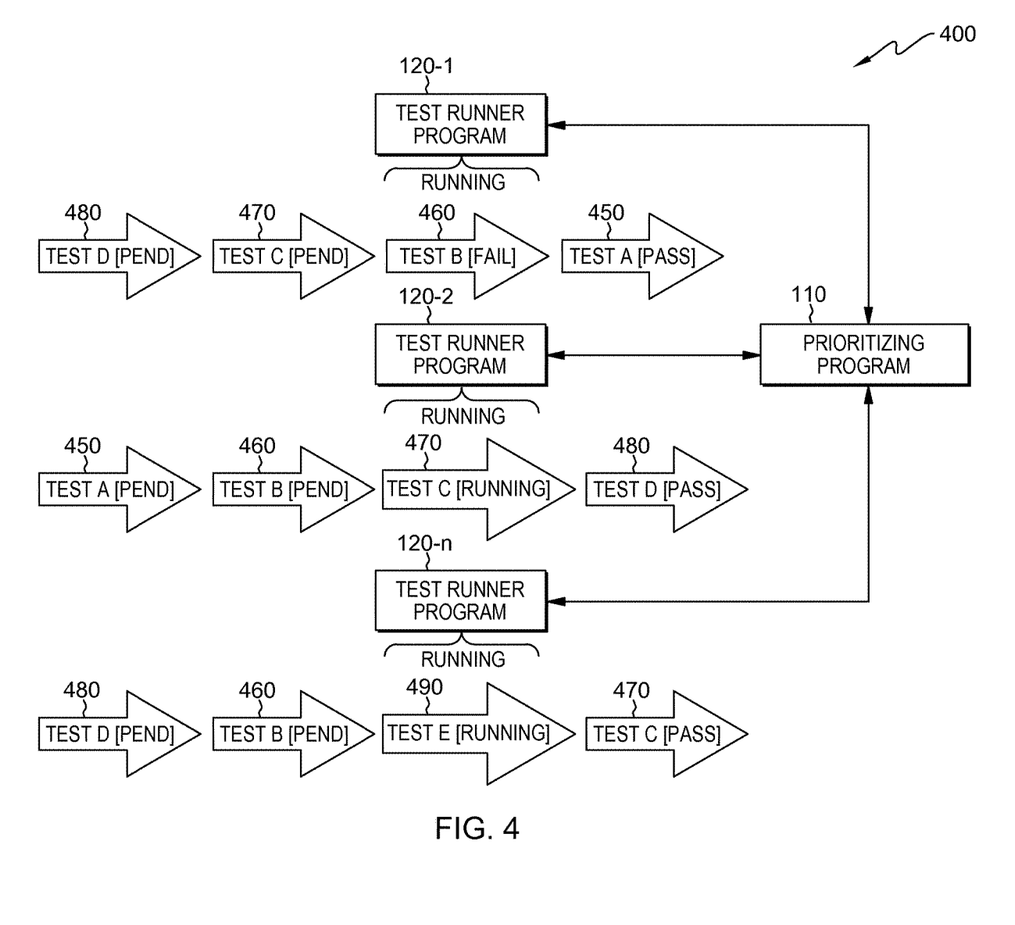
FIG. 4 depicts an example of the way a failed test is prioritized in future test runs.

FIG. 4 depicts an example of the way a failed test is prioritized in future test runs, in accordance with an embodiment of the present invention.

FIG. 4 depicts test runner program 120-1, test runner program 120-2, test runner program 120-n, prioritizing program 110, test A 450, test B 460, test C 470, test D 480, and test E 490. Even though the depicted embodiment shows three test runner programs 120, there could be two or there could be an infinite number of test runner program 120. The depicted embodiment shows an embodiment of a prioritizing program 110 and a plurality of test runner programs 120-1 through 120-n after prioritizing program 110 has contacted test runner program 120-2 and test runner program 120-n about a failed test B 420 in test runner program 120-1. The following explains how test runner programs 120-1 through 120-n communicate with prioritizing program 110.

Test runner program 120-1 indicates that test A 450 has passed, test D 480 and test C 470 are pending, and test B 460 is running and has just failed. Test runner program 120-1 communicates, at least, the failure of test B 460 to prioritizing program 110. In response to this communication, prioritizing program 110 relays the information to test runner program 120-2 and test runner program 120-n. Once test runner program 120-2 and test runner program 120-n receive a reordered priority list from prioritizing program 110, test runner program 120-2 and test runner program 120-n reorders pending tests to allow for test B 460 to have higher priority. Therefore, test runner program 120-2 shows that test D 480 has passed, test C 470 is running, and test A 450 and test B 460 are pending, with test B 460 set to run next. Additionally, test runner program 120-n shows that test C 470 has passed, test E 490 is running, and test D 480 and test B 460 are pending, with test B 460 set to run next.

In the embodiment depicted in FIG. 4, a prioritizing program 110 communicates with a plurality of test runner programs 120. For example, various test runner hosts may connect to a central server over a network. When test runner programs 120 are initiated, the test runner programs 120 are assigned a workload in the form of a queue of tests to run. As each test runner program 120 runs a test, the test runner program 120 reports the outcome to prioritizing program 110. When a test fails, prioritizing program 110 is informed, and prioritizing program 110 instructs the other test runner programs 120 to prioritize the failed test if the failed test exists in the other test runner programs' 120 queue of tests to run.

Figure 5:
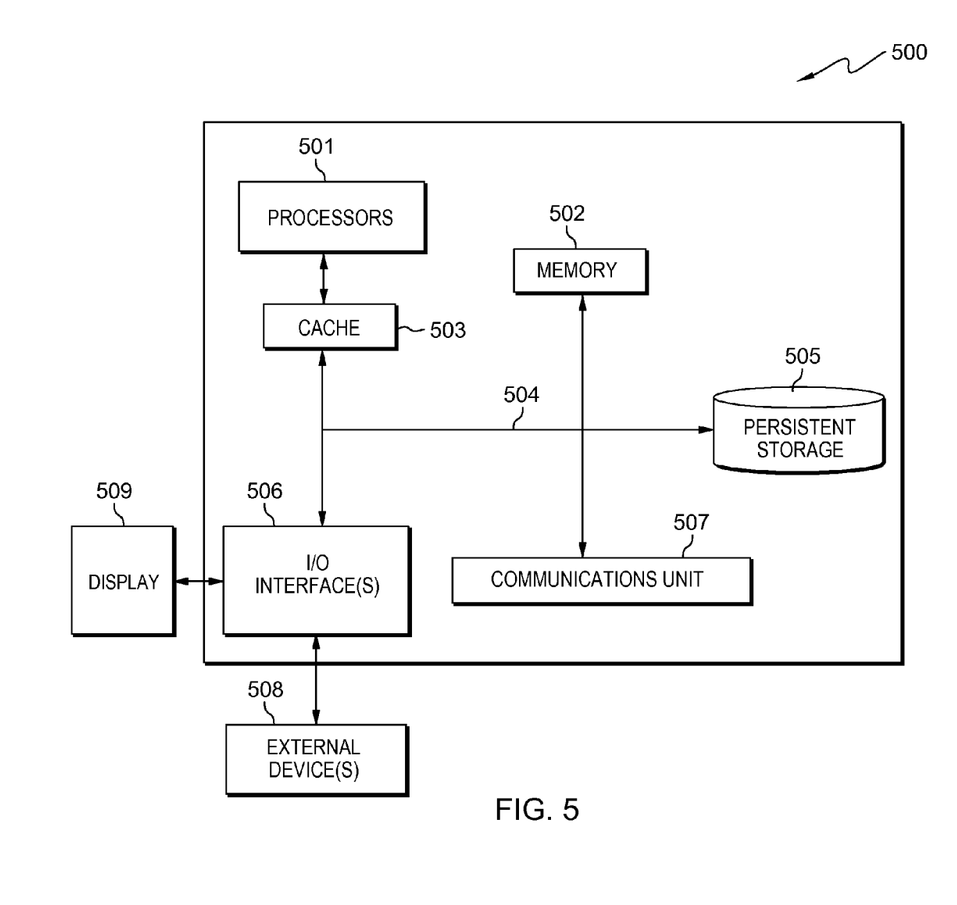
FIG. 5 depicts a block diagram of components of the server and/or the computing device, in accordance with an embodiment of the present invention.

FIG. 5 depicts computer system 500, which is an example of a system that includes components of server 30 and/or computing device 40. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Prioritizing program 110 and prioritizing database 130 may be downloaded to persistent storage 505 of server 30 through communications unit 507 of server 30. Test runner program 120 may be downloaded to persistent storage 505 of computing device 40 through communications unit 507 of computing device 40.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., prioritizing program 110 and prioritizing database 130, can be stored on such portable computer readable storage media and can be loaded onto persistent storage 505 of server 30 via I/O interface(s) 506 of server 30. Software and data used to practice embodiments of the present invention, e.g., test runner program 120, can be stored on such portable computer readable storage media and can be loaded onto persistent storage 505 of computing device 40 via I/O interface(s) 506 of computing device 40. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a set of tests to run on a set of platforms, the method comprising:
    identifying, by one or more processors, (i) a set of tests to run on a set of networked operating system platforms and (ii) one or more priorities associated with the set of tests, wherein each networked operating system platform comprises a type of device and an operating system;
    sending, by one or more processors, the set of tests and the one or more priorities associated with the set of tests to the set of networked operating system platforms;
    receiving, by one or more processors, during a first test run on a first networked operating system platform, information about the first test run of a first test on the first networked operating system platform of the set of networked operating system platforms, wherein the first networked operating system platform includes a first operating system;
    determining, by one or more processors, during the first test run, that the first test failed on the first networked operating system platform;
    updating, by one or more processors, during the first test run, the one or more priorities associated with the set of tests, such that the first test is associated with an increased priority on at least a second networked operating system platform of the set of networked operating system platforms, wherein:
        the second networked operating system platform includes the first operating system; and
        the first networked operating system platform and the second networked operating system platform are of different device types;
    sending, by one or more processors, during the first test run and prior to completion of executing the set of tests, the updated one or more priorities associated with the set of tests to at least the second networked operating system platform to allow the first test to run on the second networked operating system platform with the increased priority during the first test run;
    causing, by one or more processors, the second networked operating system platform to run the first test with the increased priority; and
    determining, by one or more processors, that the first operating system is a cause of failure of the first test run on the first networked operating system platform, based on a result of the first test on the second networked operating system platform.

2. The method of claim 1, further comprising:
    responsive to sending the set of tests and the one or more priorities associated with the set of tests to the set of networked operating system platforms, causing, by one or more processors, the first test to run on the first networked operating system platform; and responsive to sending the updated one or more priorities associated with the set of tests to at least the second networked operating system platform, causing, by one or more processors, the first test to run on the second networked operating system platform.

3. The method of claim 1, wherein the information about the first test run indicates the test failed.

4. The method of claim 1, further comprising:
associating, by one or more processors, diagnostic information with the first test on the second networked operating system platform, wherein the diagnostic information is based on, at least the information about the first test run of the first test on the first networked operating system platform.

5. The method of claim 1, wherein updating the one or more priorities associated with the set of tests, such that the first test is associated with the increased priority on at least the second networked operating system platform of the set of networked operating system platforms comprises:
updating, by one or more processors, the one or more priorities associated with the set of tests, such that the first test will run sooner than scheduled per the sent one or more priorities.

6. A computer program product for managing a set of tests to run on a set of platforms, the computer program product comprising:
one or more computer readable storage media and program instructions stored on the one or more computer readable storage media, the program instructions comprising:
program instructions to identify (i) a set of tests to run on a set of networked operating system platforms and (ii) one or more priorities associated with the set of tests, wherein each networked operating system platform comprises a type of device and an operating system;
program instructions to send the set of tests and the one or more priorities associated with the set of tests to the set of networked operating system platforms;
program instructions to receive, during a first test run on a first networked operating system platform, information about the first test run of a first test on the first networked operating system platform of the set of networked operating system platforms, wherein the first networked operating system platform includes a first operating system;
program instructions to determine, during the first test run, that the first test failed on the first networked operating system platform;
program instructions to update, during the first test run, the one or more priorities associated with the set of tests, such that the first test is associated with an increased priority on at least a second networked operating system platform of the set of networked operating system platforms, wherein:
the second networked operating system platform includes the first operating system; and
the first networked operating system platform and the second networked operating system platform are of different device types;
program instructions to send, during the first test run and prior to completion of executing the set of tests, the updated one or more priorities associated with the set of tests to at least the second networked operating system platform to allow the first test to run on the second networked operating system platform with the increased priority during the first test run;
program instructions to cause the second networked operating system platform to run the first test with the increased priority; and
program instructions to determine that the first operating system is a cause of failure of the first test run on the first networked operating system platform, based on a result of the first test on the second networked operating system platform.

7. The computer program product of claim 6, further comprising:
responsive to sending the set of tests and the one or more priorities associated with the set of tests to the set of networked operating system platforms, program instructions, stored on the one or more computer readable storage media, to cause the first test to run on the first networked operating system platform; and
responsive to sending the updated one or more priorities associated with the set of tests to at least the second networked operating system platform, program instructions, stored on the one or more computer readable storage media, to cause the first test to run on the second networked operating system platform.

8. The computer program product of claim 6, wherein the information about the first test run indicates the test failed.

9. The computer program product of claim 6, further comprising:
program instructions, stored on the one or more computer readable storage media, to associate diagnostic information with the first test on the second networked operating system platform, wherein the diagnostic information is based on, at least the information about the first test run of the first test on the first networked operating system platform.

10. The computer program product of claim 6, wherein program instructions to update the one or more priorities associated with the set of tests, such that the first test is associated with the increased priority on at least the second platform of the set of networked operating system platforms comprise:
program instructions to update the one or more priorities associated with the set of tests, such that the first test will run sooner than scheduled per the sent one or more priorities.

11. A computer system for managing a set of tests to run on a set of platforms, the computer system comprising:
one or more computer processors, one or more computer readable storage media, and program instructions stored on the one or more computer readable storage media for execution by at least one of the one or more computer processors, the program instructions comprising:
program instructions to identify (i) a set of tests to run on a set of networked operating system platforms and (ii) one or more priorities associated with the set of tests, wherein each networked operating system platform comprises a type of device and an operating system;
program instructions to send the set of tests and the one or more priorities associated with the set of tests to the set of networked operating system platforms;
program instructions to receive, during a first test run on a first networked operating system platform, information about the first test run of a first test on the first networked operating system platform of the set of networked operating system platforms, wherein the first networked operating system platform includes a first operating system;

program instructions to determine, during the first test run, that the first test failed on the first networked operating system platform;

program instructions to update, during the first test run, the one or more priorities associated with the set of tests, such that the first test is associated with an increased priority on at least a second networked operating system platform of the set of networked operating system platforms, wherein:

the second networked operating system platform includes the first operating system; and the first networked operating system platform and the second networked operating system platform are of different device types;

program instructions to send, during the first test run and prior to completion of executing the set of tests, the updated one or more priorities associated with the set of tests to at least the second networked operating system platform to allow the first test to run on the second networked operating system platform with the increased priority during the first test run;

program instructions to cause the second networked operating system platform to run the first test with the increased priority; and program instructions to determine that the first operating system is a cause of failure of the first test run on the first networked operating system platform, based on a result of the first test on the second networked operating system platform.

12. The computer system of claim 11, further comprising:

responsive to sending the set of tests and the one or more priorities associated with the set of tests to the set of networked operating system platforms, program instructions, stored on the one or more computer readable storage media for execution by at least one of the one or more computer processors, to cause the first test to run on the first networked operating system platform; and responsive to sending the updated one or more priorities associated with the set of tests to at least the second networked operating system platform, program instructions, stored on the one or more computer readable storage media for execution by at least one of the one or more computer processors, to cause the first test to run on the second networked operating system platform.

13. The computer system of claim 11, wherein the information about the first test run indicates the test failed.

14. The computer system of claim 11, further comprising:

program instructions, stored on the one or more computer readable storage media for execution by at least one of the one or more computer processors, to associate diagnostic information with the first test on the second networked operating system platform, wherein the diagnostic information is based on, at least the information about the first test run of the first test on the first networked operating system platform.

15. The computer system of claim 11, wherein program instructions to update the one or more priorities associated with the set of tests, such that the first test is associated with the increased priority on at least the second networked operating system platform of the set of networked operating system platforms comprise:

program instructions to update the one or more priorities associated with the set of tests, such that the first test will run sooner than scheduled per the sent one or more priorities.

16. The method of claim 1, wherein sending, during the first test run, the updated one or more priorities associated with the set of tests further comprises enabling additional debugging options that increase an amount of diagnostic information provided by the first test.

* * * * *